United States Patent
Chang et al.

(10) Patent No.: US 10,636,271 B2
(45) Date of Patent: Apr. 28, 2020

(54) INDOOR AIR QUALITY CONTROL SYSTEM

(71) Applicant: Tamkang University, New Taipei (TW)

(72) Inventors: Shih-Hao Chang, New Taipei (TW); Wen-Yen Li, New Taipei (TW); Hsu-Tang Hsieh, New Taipei (TW)

(73) Assignee: TAMKANG UNIVERSITY, New Taipei (TW)

( * ) Notice: Subject to any disclaimer, the term of this patent is extended or adjusted under 35 U.S.C. 154(b) by 30 days.

(21) Appl. No.: 16/117,521

(22) Filed: Aug. 30, 2018

(65) Prior Publication Data
US 2019/0108746 A1 Apr. 11, 2019

(30) Foreign Application Priority Data
Oct. 5, 2017 (TW) .............................. 106134418 A

(51) Int. Cl.
| | |
|---|---|
| *G08B 21/12* | (2006.01) |
| *B60H 1/00* | (2006.01) |
| *B60H 3/00* | (2006.01) |
| *B60H 1/24* | (2006.01) |
| *G05B 13/02* | (2006.01) |

(52) U.S. Cl.
CPC ............ *G08B 21/12* (2013.01); *B60H 1/008* (2013.01); *B60H 1/00357* (2013.01); *B60H 1/00792* (2013.01); *B60H 1/24* (2013.01); *B60H 3/00* (2013.01); *B60H 3/0085* (2013.01); *G05B 13/021* (2013.01)

(58) Field of Classification Search
None
See application file for complete search history.

(56) References Cited

U.S. PATENT DOCUMENTS

| | | | | |
|---|---|---|---|---|
| 5,597,354 A | * | 1/1997 | Janu | .................... F24F 11/30 454/229 |
| 6,161,764 A | * | 12/2000 | Jatnieks | ................... F24F 3/044 236/49.3 |
| 9,593,861 B1 | * | 3/2017 | Burnett | .................... F24F 11/30 |
| 10,286,918 B2 | * | 5/2019 | Mullett | .................. B60H 1/008 |
| 10,458,668 B2 | * | 10/2019 | Emmons | .................. F24F 11/30 |
| 2008/0182506 A1 | * | 7/2008 | Jackson | .................... F24F 11/30 454/354 |

(Continued)

*Primary Examiner* — Ramesh B Patel
(74) *Attorney, Agent, or Firm* — Birch, Stewart, Kolasch & Birch, LLP

(57) ABSTRACT

An indoor air quality control system, including a plurality of fixed detectors, an unmanned vehicle platform and a cloud computing platform. The fixed detectors detect the indoor air quality at respective designated positions in an indoor area. The unmanned vehicle platform moves along a designated route in the indoor area. When an index corresponding to the indoor air quality at a designated position reaches an air pollution warning value, a processing unit of the unmanned vehicle platform controls the unmanned vehicle platform to move towards a corresponding one of the designated positions and controls an air cleaning device on the unmanned vehicle platform to perform air cleaning. The cloud computing platform receives the indoor air quality detected by the respective fixed detectors and the mobile air quality detected by a mobile detector on the unmanned vehicle platform over the Internet.

9 Claims, 3 Drawing Sheets

(56) References Cited

U.S. PATENT DOCUMENTS

| | | | | |
|---|---|---|---|---|
| 2013/0174646 A1* | 7/2013 | Martin | ................... | G01N 33/00 |
| | | | | 73/31.02 |
| 2016/0116181 A1* | 4/2016 | Aultman | .................. | F24F 11/30 |
| | | | | 700/276 |
| 2016/0318368 A1* | 11/2016 | Alger | ................. | B60H 1/00771 |
| 2018/0001249 A1* | 1/2018 | Sher | ....................... | B01D 45/02 |
| 2018/0119973 A1* | 5/2018 | Rothman | ................. | F24F 11/62 |

\* cited by examiner

INDOOR AIR QUALITY CONTROL SYSTEM

CROSS-REFERENCE TO RELATED APPLICATION

This non-provisional application claims priority under 35 U.S.C. § 119(a) to Patent Application No. 106134418 filed in Taiwan, R.O.C. on Oct. 5, 2017, the entire contents of which are hereby incorporated by reference.

BACKGROUND

Technical Field

The instant disclosure generally relates to an air cleaning system and, more particularly, to an indoor air quality control system.

Related Art

Current air pollution detection and monitoring is mainly conducted by official or academic institutions that set up detection stations at selected locations to perform outdoor detection so as to provide the air pollution index (for example, the PM 2.5 concentration) and distribution profiles thereof through the data acquired from the detection stations.

The foregoing detection results and distribution profiles can be used to update a database through the network in real time. Usually, the data in the database also provides an open communication protocol and a link such that the public may obtain the air quality detection result through the network at any time. However, the selection of detection stations is often highly related to regional development and results in an alternative form of an urban-rural gap. Metropolitan areas, densely inhabited districts, and industrial areas may have relatively dense detection station settings, while remote rural areas, even near highly pollution source, may have relatively few detection stations. Additionally, the aforementioned detection stations are configured to detect the outdoor air pollution. The indoor air quality may involve the interaction between the indoor conditions and the outdoor air quality, which leads to various air pollution modes. Most people may not know the indoor air quality. The general issue is that most people may tend to stay indoors because they are informed of outdoor air quality warnings through open information. However, the indoor air quality may be unhealthy due to various interactions, which people are not aware of.

The indoor air quality is not easy to obtain. In addition to the outdoor air quality, the indoor air conditions and pollution sources are major factors affecting the indoor air quality. These data cannot be acquired through open outdoor air quality databases. In addition, fixedly installed monitoring mechanisms (for example, the prior-art air cleaners with air quality detection) can only monitor and clean the indoor air in a fixed indoor space.

As previously stated, the indoor air conditions and pollution sources are major factors that affect the indoor air quality. In particular, the inability of the indoor air causes dust to damage the human body. The dust indoors results from, for example, the outside, the indoor atmosphere, and the dust mites in the bedding. The currently available air cleaning products can filter out these micro-dust particles. However, most of them require humans to manually turn them on and do the settings, and can only passively perform air cleaning instead of actively finding out pollution sources.

In addition, the currently available air cleaning products can only be turned on manually, or at a regular time, instead of being turned on necessarily when air cleaning is most needed, resulting in wasted power. Even the products equipped with air quality detectors can only detect the local air quality instead of the air quality in the entire indoor space.

Therefore, even though household air cleaning devices have become more and more common home appliances, the air cleaning devices may not be turned on at the right time or may not be installed in the areas where air pollution is most severe because the indoor air quality is not clearly known, resulting in poor air cleaning efficiency and low energy efficiency.

SUMMARY

In view of the above, in at least one embodiment, this disclosure provides an indoor air quality control system that can efficiently perform indoor air quality control and facilitate remote data collection and management.

In at least one embodiment, the indoor air quality control system of this disclosure is configured to monitor and adjust the air quality in an indoor area. The indoor air quality control system includes a plurality of fixed detectors, an unmanned vehicle platform, and a cloud computing platform.

In at least one embodiment, the fixed detectors are respectively installed at a plurality of designated positions in the indoor area and configured to detect the indoor air quality at each of the plurality of designated positions. Each of the plurality of fixed detectors includes a first communication interface configured to transmit information of the indoor air quality outwards. The unmanned vehicle platform is configured to move along a designated route in the indoor area. The unmanned vehicle platform is at least equipped with a second communication interface, a processing unit, a mobile detector, and a mobile air cleaning device. The second communication interface is configured to receive the information of the indoor air quality from the first communication interface, and the second communication interface is connected to the Internet through a network bridging device. The processing unit is connected to the first communication interface and configured to receive the information of the indoor air quality and provide the designated route to control the unmanned vehicle platform to move. The mobile detector is configured to move with the unmanned vehicle platform and detect the mobile air quality. The mobile air cleaning device is connected to the processing unit and controlled by the processing unit to turn on or turn off. The cloud computing platform is configured to receive the information of the indoor air quality detected by each of the plurality of fixed detectors and information of the mobile air quality detected by the mobile detector through the Internet. The cloud computing platform is connected to an external data source configured to acquire information of the outdoor air quality. An air pollution warning value is set by the processing unit such that the processing unit controls the unmanned vehicle platform to move towards a corresponding one of the designated positions and controls the air cleaning device to turn on and perform air cleaning when one of a plurality of indexes corresponding to the indoor air quality reaches the air pollution warning value.

In at least one embodiment, the first communication interface is a wireless communication interface.

In at least one embodiment, the unmanned vehicle platform is a ground walking platform or a miniature aircraft.

In at least one embodiment, the designated route extends partially outside the indoor area.

In at least one embodiment, the second communication interface is a wireless communication interface.

In at least one embodiment, the processing unit defines a working area in the indoor area according to the corresponding one of the designated positions and controls the unmanned vehicle platform to move to the working area to turn on the mobile air cleaning device when one of the plurality of indexes corresponding to the indoor air quality reaches the air pollution warning value.

In at least one embodiment, the cloud computing platform provides data browsing to output the information of the indoor air quality and the information of the mobile air quality according to an authorization request, and the cloud computing platform accepts the authorization request issued by a remote device to log in to browse the information of the indoor air quality and the information of the mobile air quality through the remote device.

In at least one embodiment, the remote device is capable of transmitting a current position to the cloud computing platform such that the cloud computing platform acquires information of the outdoor air quality corresponding to the current position from the external data source according to the current position and transmits the information of the outdoor air quality to the remote device.

In at least one embodiment, the cloud computing platform actively transmits an outdoor air pollution warning message to the remote device according to the air pollution warning value when an index corresponding to the outdoor air quality at the current position where the remote device is located reaches the air pollution warning value.

In at least one embodiment, the indoor air quality control system further includes at least an air conditioning apparatus such that the processing unit is connected to the air conditioning apparatus through the second communication interface to turn on the air conditioning apparatus.

In this disclosure, the mobile detector is installed on the unmanned vehicle platform. The mobile detector can move between different positions in the indoor area by route setting or the exploration mechanism of the unmanned vehicle platform. Collecting real-time information of the air quality at different positions in the indoor area helps the users find and eliminate possible pollution sources. In addition, in this disclosure, internal data and external data are collected by the cloud computing platform to use big data to analyze pollution sources and determine the best indoor air quality control strategy. The cloud computing platform also helps the users browse information through remote devices (such as smart phones), control the indoor air quality control systems, or receive instant alerts.

BRIEF DESCRIPTION OF THE DRAWINGS

This disclosure will become more fully understood from the detailed description given herein below for illustration only, and thus not limitative of this disclosure, wherein.

DETAILED DESCRIPTION

Figure 1:
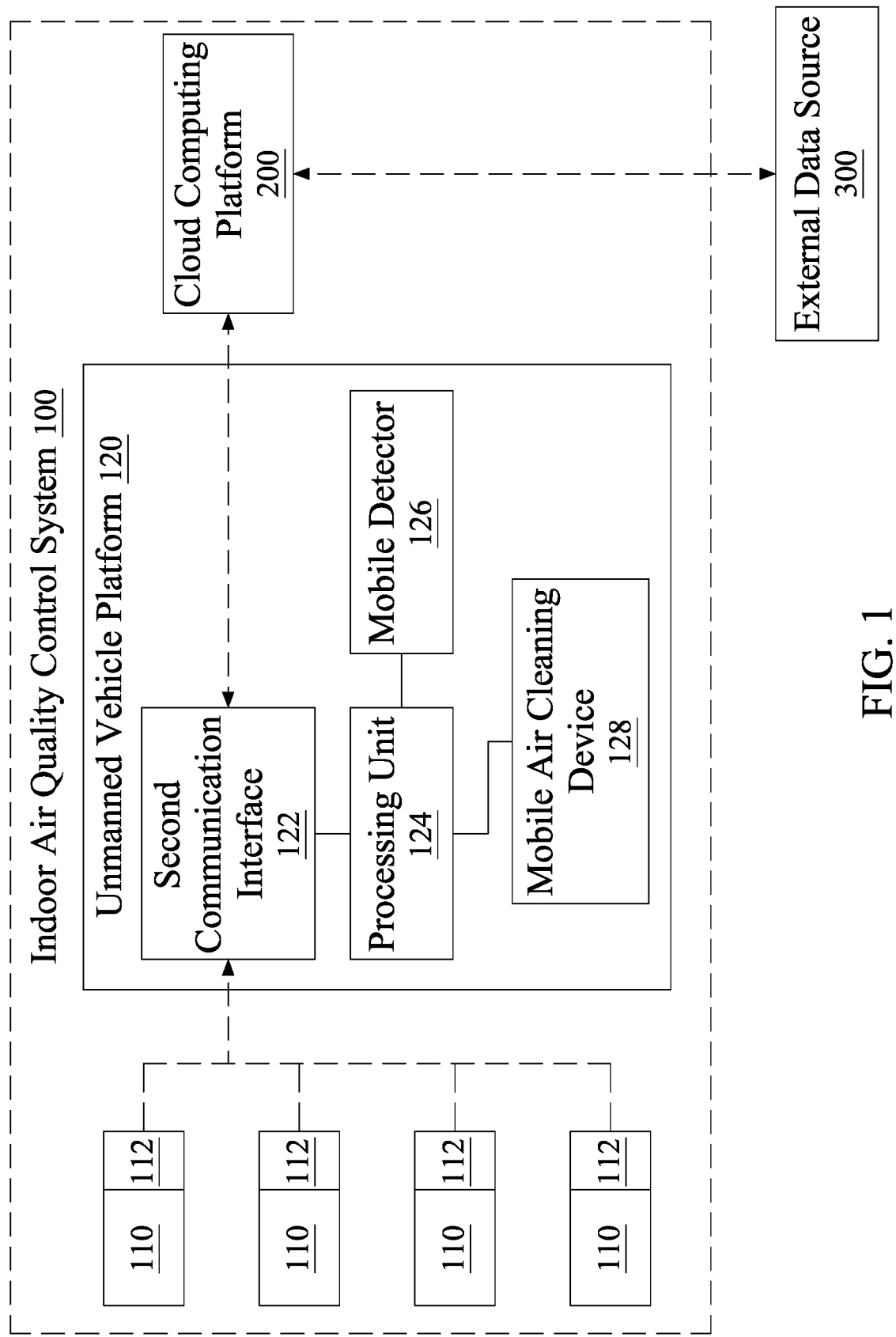
FIG. 1 is a system block diagram of an indoor air quality control system according to an embodiment of this disclosure.

With reference to FIG. 1, an indoor air quality control system 100 is provided in one embodiment of this disclosure, which is configured to monitor and adjust the air quality in an indoor area. The indoor air quality control system 100 includes a plurality of fixed detectors 110, an unmanned vehicle platform 120, and a cloud computing platform 200.

Figure 2:
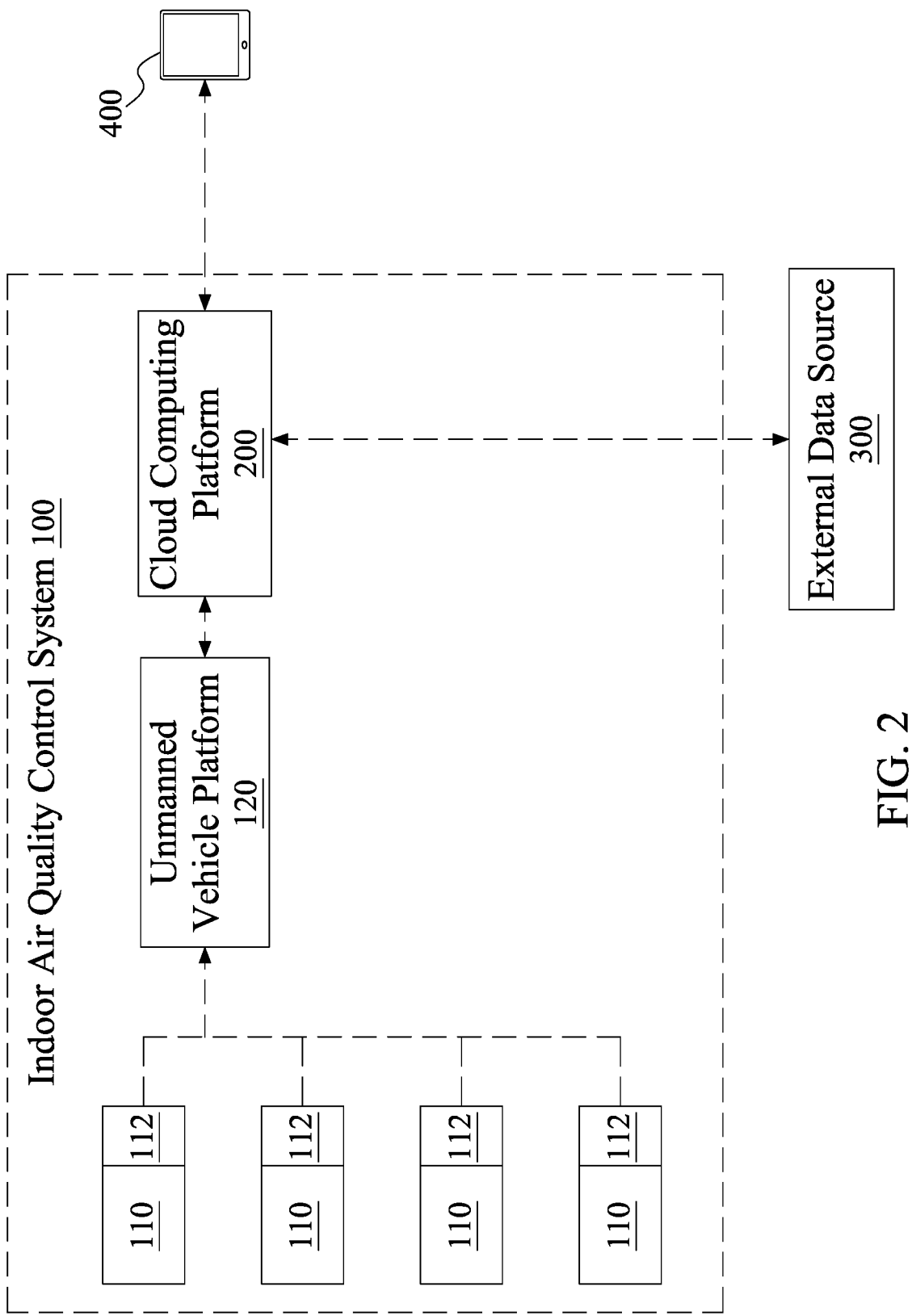
FIG. 2 is a system block diagram of an indoor air quality control system including a remote device according to another embodiment of this disclosure.

As shown in FIG. 1 and FIG. 2, the fixed detectors 110 are respectively installed at a plurality of designated positions in the indoor area and configured to detect the indoor air quality at each of the plurality of designated positions. Each of the fixed detectors 110 includes a first communication interface 112 configured to transmit information of the indoor air quality outwards. In one embodiment, the first communication interface 112 is a wireless communication interface for transmitting information of the indoor air quality via Wi-Fi protocol, Bluetooth protocol or ZigBee protocol.

As shown in FIG. 1, the unmanned vehicle platform 120 is configured to move along a designated route in the indoor area. The unmanned vehicle platform 120 may be a ground walking platform, for example, a miniature unmanned vehicle, a sweeping robot, etc. The unmanned vehicle platform 120 may also be a miniature aircraft, for example, a multi-axis aircraft capable of flying in the air. The movement of the miniature aircraft is more unlimited, and the miniature aircraft can further move between different floors such that the indoor area may extend to multiple floors, even extending the designated route partially outside the indoor area.

The aforementioned examples of the unmanned vehicle platform 120 are only exemplary and are never intended to limit possible implementations. The specific structure of the unmanned vehicle platform 120 is not a technical issue to be improved in this disclosure and can be easily implemented based on ordinary skill in the art. Therefore, the detailed description thereof will not be presented below.

As shown in FIG. 1, the unmanned vehicle platform 120 is at least equipped with a second communication interface 122, a processing unit 124, a mobile detector 126, and a mobile air cleaning device 128.

In one embodiment, the second communication interface 122 is a wireless communication interface configured to receive the information of the indoor air quality from the first communication interface 112 via Wi-Fi protocol, Bluetooth protocol or ZigBee protocol. The second communication interface 122 may be connected to the Internet through a network bridging device (for example, a Wi-Fi AP).

The processing unit 124 is connected to the first communication interface 112 and configured to receive the information of the indoor air quality. The processing unit 124 is configured to provide the designated route to control the unmanned vehicle platform 120 to move. The designated route may be provided according to an externally input set value (for example, a turning point or a virtual wall) received by the processing unit 124. The processing unit 124 may also initiate a map discovery mechanism (such as an exploration mechanism of a sweeping robot) and explore the indoor area to establish a map of the indoor area by itself, and provide a designated route that can completely go through the entire indoor area. In such a map discovery mechanism, a positioning aid can be used to assist positioning to improve positioning accuracy, or a virtual wall can be built up to set the moving range of the unmanned vehicle platform 120. The aforementioned positioning aid may be a Wi-Fi device, a Bluetooth device, or a ZigBee device, which is actually the second communication interface 122 equipped on the unmanned vehicle platform 120, using a network bridging device or the first communication interface 112 of the fixed detector 110 as a positioning station to perform triangulation. Additionally, it may also be an RFID or an infrared emitter installed in the indoor area. A corresponding RFID reader or an infrared receiver equipped on the unmanned vehicle platform 120 may read the RFID or receive the infrared signal to determine the current position.

The mobile detector 126 is configured to move with the unmanned vehicle platform 120 and detect the mobile air quality along the designated route. The data corresponding to the mobile air quality includes, in addition to the detected value of the air pollution condition, position information for obtaining the detected value. The designated route may substantially extend partially to the outdoor area (outside the indoor area) such that the mobile air quality may further include the outdoor air quality corresponding to the indoor area.

In one embodiment, the air quality detection value is the concentration of PM 2.5 particles, but other forms of pollution are not excluded.

The mobile air cleaning device 128 is connected to the processing unit 124 and controlled by the processing unit 124 to turn on or turn off.

An air pollution warning value is set by the processing unit 124. The processing unit 124 controls the unmanned vehicle platform 120 to move towards a corresponding one of the designated positions and controls the air cleaning device to turn on and perform air cleaning when one of a plurality of indexes corresponding to the indoor air quality reaches the air pollution warning value. More particularly, the processing unit 124 defines a working area in the indoor area according to the corresponding one of the designated positions when one of the plurality of indexes corresponding to the indoor air quality (for example, the PM 2.5 concentration) at one or more designated positions reaches the air pollution warning value (for example, the upper limit of the PM 2.5 concentration). Then, the processing unit 124 controls the unmanned vehicle platform 120 to move to the working area to turn on the mobile air cleaning device 128 to perform air cleaning and adjust the air quality. The processing unit 124 further changes the working area in real time according to the variation of the indoor air quality at one or more designated positions such that the unmanned vehicle platform 120 moves to a new working area. At last, when all the indexes corresponding to the indoor air quality at the plurality of designated positions are lower than the air pollution warning value, the mobile air cleaning device 128 is turned off. In this way, the mobile air cleaning device 128 can be turned on when the air quality is poor and turned off after the air quality reaches the required standard such that the energy efficiency is optimized.

The air pollution warning value may be the upper limit of the concentration of PM 2.5 particles, the upper limit of the concentration of volatile organic gas (for example, formaldehyde), the upper limit of the concentration of carbon dioxide, the upper limit of the concentration of carbon monoxide, the upper limit of the concentration of nitrogen oxide (NOx), or even the upper limit of the concentration of ozone (from the operating appliances or electronic products). The processing unit 124 compares the current indoor air quality detection result with the air pollution warning value in real time. If the indoor air quality detection result reaches the air pollution warning value, the processing unit 124 will take corresponding measures. If air pollution results from PM 2.5 particles, the mobile air cleaning device 128 may be turned on. If air pollution is caused by volatile organic gas, carbon dioxide, carbon monoxide, nitrogen oxide (NOx) or ozone, general air cleaning mechanisms cannot be used such that other processing mechanisms may be activated or warnings may be issued.

Additionally, the processing unit 124 also continues to monitor the mobile air quality. The processing unit 124 controls the unmanned vehicle platform 120 to move according to a designated route or a map discovery mechanism and uses the mobile detector 126 to analyze the position where air pollution is the most serious.

The cloud computing platform 200 receives the information of the indoor air quality detected by each of the plurality of fixed detectors 110 and information of the mobile air quality detected by the mobile detector 126 through the Internet. The cloud computing platform is connected to an external data source configured to acquire information of the outdoor air quality. The cloud computing platform 200 is further connected to an external data source 300 configured to acquire information of the outdoor air quality. The outdoor air quality detection result includes detected values and detected positions.

The cloud computing platform 200 can serve as a data relay and a backup station for recording the indoor air quality detected by the fixed detectors 110 located in the indoor area and the mobile air quality detected by the mobile detector 126.

As shown in FIG. 2, the cloud computing platform 200 of the indoor air quality control system 100 further provides data browsing to output the information of the indoor air quality and the information of the mobile air quality according to an authorization request. The user can connect to the cloud computing platform 200 through a remote device 400, and send an authorization request to log in to the cloud computing platform 200. The remote device 400 is a portable wireless electronic device that connects to the cloud computing platform 200 by executing a software program. The portable wireless electronic device may be a smart phone, a tablet computer, a navigation device, or a notebook computer. The remote device 400 can be connected to the Internet through Wi-Fi and then connected to the cloud computing platform 200, or the remote device 400 can be connected to the Internet through a mobile communication network and then connected to the cloud computing platform 200. The user can browse the information of the indoor air quality and the information of the motor air quality through the remote device 400. At the same time, the remote device 400 can also monitor the operations of the unmanned vehicle platform 120 and the mobile air cleaning device 128 in real time through the cloud computing platform 200, and the user can manually input the set value of the designated route and manually turn on or off the mobile air cleaning device 128.

Although the cloud computing platform 200 shown in FIG. 1 and FIG. 2 is connected to only one unmanned vehicle platform 120, the cloud computing platform 200 may actually be connected to various unmanned vehicle platforms 120 located in different indoor spaces to form different indoor air quality control systems 100. The authorization request of the user-end remote device 400 may correspond to one of the indoor spaces, and may correspond to a plurality of indoor spaces at the same time.

Additionally, after the remote device 400 authorizes the request to log in to the cloud computing platform 200, the remote device 400 may transmit a current position to the cloud computing platform 200 such that the cloud computing platform 200 acquires the outdoor air quality detection result corresponding to the current position from the external data source 300 according to the current position. The outdoor air quality detection result is transmitted to the remote device 400 for the user's reference. Additionally, the cloud computing platform 200 can actively transmit an outdoor air pollution warning message to the remote device 400 according to an air pollution warning value when an index corresponding to the outdoor air quality at the present position where the remote device 400 is located reaches the air pollution warning value. Additionally, the air pollution warning value may be an official standard set in the cloud computing platform 200, or set by the remote device 400 and transmitted to the cloud computing platform 200.

By recording data in the cloud computing platform 200 and receiving the data through the remote device 400, the time and position where the maximum dust concentration and the minimum dust concentration value appear and the recent change in the dust concentration value can be analyzed through a curve diagram. Through long-term monitoring, it can be observed that the concentration of dust in a certain point in time or in a period of time may suddenly rise, such that the indoor air quality gets worse. By exploring the main reason why the concentration becomes higher, the best indoor air quality may be achieved when those acts or items are prevented or avoided.

Although the fixed detectors 110 are fixedly distributed indoors, they can only analyze the indoor pollution source in a large area. The map discovery mechanism of the unmanned vehicle platform 120 and the instant message obtained by the mobile detector 126 can instantly change the designated route such that the area explored by the map discovery mechanism of the unmanned vehicle platform 120 is gradually narrowed down to position the pollution source. In addition, the mobile air cleaning device 128 can move to the vicinity of the pollution source with the unmanned vehicle platform 120 to achieve an optimized air cleaning effect.

In addition, since the cloud computing platform 200 can acquires information of the outdoor air quality from the external data source 300. Therefore, big data analysis can be used to analyze the potential indoor air pollution sources using time sequence and discuss the interaction between the indoor air and the outdoor air to facilitate the operation of the indoor air cleaning mechanism to achieve optimal operation. For example, when the cloud computing platform 200 acknowledges from the external data source 300 that the index corresponding to the outdoor air quality reaches the air pollution warning value, the cloud computing platform 200 may send an alert to the processing unit 124 such that the processing unit 124 turns on the air conditioning apparatus 130 or even the mobile air cleaning device 128 (the index corresponding to the indoor air quality has not reached the air pollution warning value) to shut down the external ventilation, forcibly discharge the air to the outside, and activate the air cleaning device in the affected area so as to reduce the influence of the outdoor air quality on the indoor area.

Figure 3:
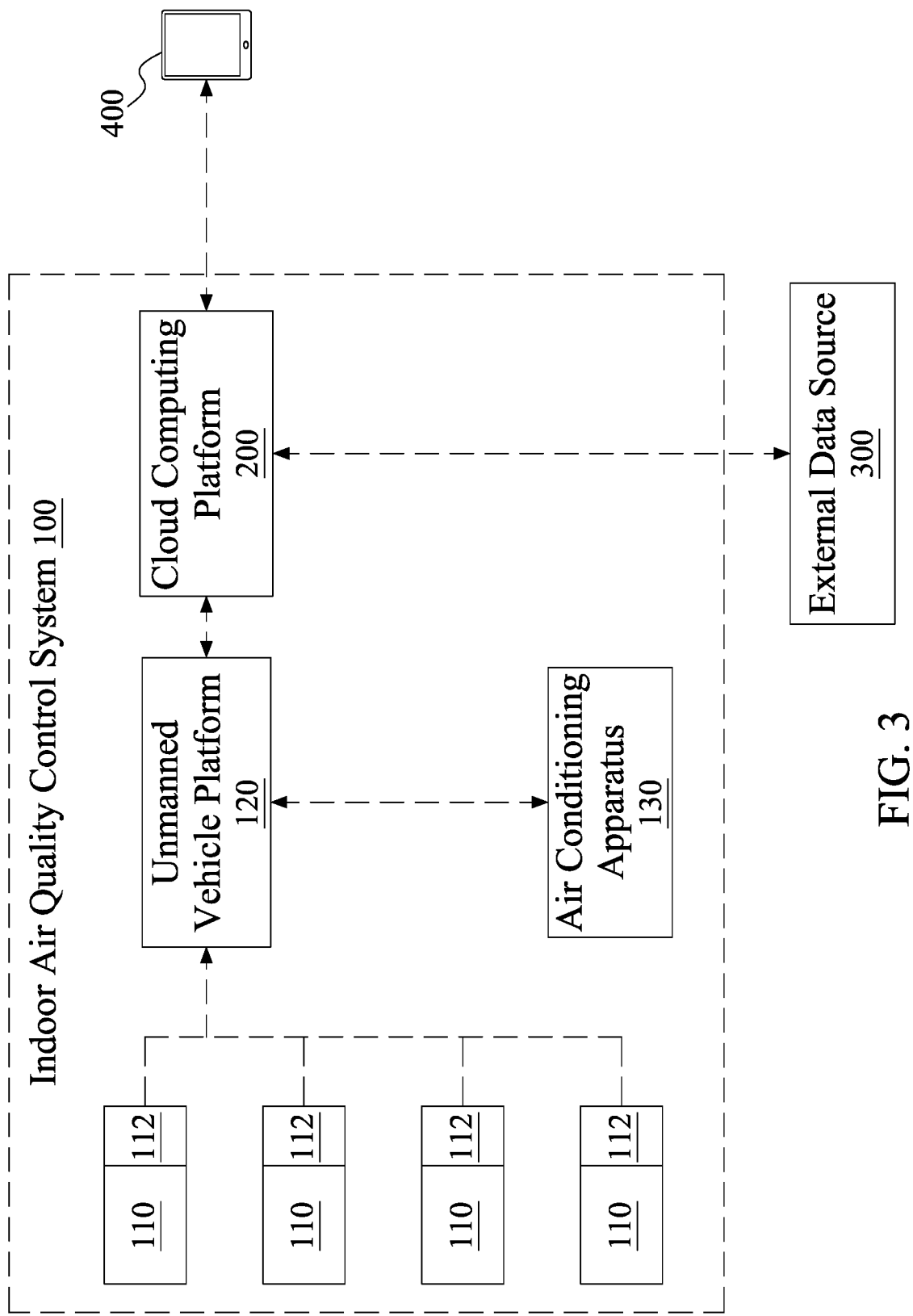
FIG. 3 is a system block diagram of an indoor air quality control system including an air conditioning apparatus according to still another embodiment of this disclosure.

As shown in FIG. 3, the indoor air quality control system 100 further includes other air conditioning apparatuses 130 that are fixedly installed. These air conditioning apparatuses 130 include fixedly installed air cleaning devices, ventilation devices, air shutter automatic opening/closing devices, etc. To design a working area and move the mobile air cleaning device 128, the processing unit 124 may also connect to the air conditioning apparatus 130 through the second communication interface 122 and turn on the air conditioning apparatus 130 to enhance air quality control. Similarly, when all the indexes corresponding to the indoor air quality at the designated positions are lower than the air pollution warning value, the processing unit 124 turns off the air conditioning apparatus 130.

As previously stated, the prior art indoor air cleaning mechanism cannot be turned on and off at the right time, resulting in poor energy efficiency. In one embodiment of this disclosure, the processing unit 124 may turn on or off the mobile air cleaning device 128 at the right time. Certainly, some pollution sources, such as gas pollution (such as carbon monoxide and carbon dioxide), cannot be eliminated by the mobile air cleaning device 128. The processing unit 124 may activate the air conditioning apparatus 130, such as a ventilation device, an air shutter automatic opening/closing device, etc. to force indoor air to be exchanged with outdoor air. Otherwise, when detecting hazardous gas (such as carbon monoxide and carbon dioxide) reached the air pollution warning value, the cloud computing platform 200 may issue a warning message to a designated target or the fire police unit to seek assistance from a third party. In addition, the rapid fluctuation of carbon dioxide may also be used to determine the change in the number of indoor personnel, which can be applied to the security system to determine whether the indoor area has been invaded.

In the instant disclosure, the mobile detector 126 is installed on the unmanned vehicle platform 120. The mobile detector 126 can move between different positions in the indoor area by route setting or the exploration mechanism of the unmanned vehicle platform 120. Collecting real-time information of the air quality at different positions in the indoor area helps the users find and eliminate possible pollution sources. The collection of real-time information of air quality can be used as a basis for big data, and more use can be made using big data analysis.

What is claimed is:

1. An indoor air quality control system, configured to monitor and adjust the indoor air quality in an indoor area, said indoor air quality control system comprising:
    a plurality of fixed detectors respectively installed at a plurality of designated positions in said indoor area and configured to detect the indoor air quality at each of said plurality of designated positions, each of said plurality of fixed detectors comprising a first communication interface configured to transmit information of the indoor air quality outwards;
    an unmanned vehicle platform configured to move along a designated route in said indoor area, wherein said unmanned vehicle platform is at least equipped with:
    a second communication interface configured to receive said information of the indoor air quality from said first communication interface, said second communication interface being connected to the Internet through a network bridging device;
    a processing unit connected to said first communication interface and configured to receive said information of the indoor air quality and provide said designated route to control said unmanned vehicle platform to move;
    a mobile detector configured to move with said unmanned vehicle platform and detect the mobile air quality; and
    a mobile air cleaning device connected to said processing unit and controlled by said processing unit to turn on or turn off; and
    a cloud computing platform configured to receive said information of the indoor air quality detected by each of said plurality of fixed detectors and information of the mobile air quality detected by said mobile detector through the Internet, said cloud computing platform being connected to an external data source configured to acquire information of the outdoor air quality;

wherein an air pollution warning value is set by the processing unit; when one of a plurality of indexes corresponding to the indoor air quality reaches said pollution warning value, said processing unit defines a working area in said indoor area according to said one of said designated positions corresponding to the one of a plurality of indexes, controls said unmanned vehicle platform to move to said working area, and controls said mobile air cleaning device to turn on and perform air cleaning to clean air within the working area, and turn off said mobile air cleaning device when said air quality is lower than said air pollution warning value.

2. The indoor air quality control system according to claim 1, wherein said first communication interface is a wireless communication interface.

3. The indoor air quality control system according to claim 1, wherein said unmanned vehicle platform is a ground walking platform or a miniature aircraft.

4. The indoor air quality control system according to claim 1, wherein said designated route extends partially outside said indoor area.

5. The indoor air quality control system according to claim 1, wherein said second communication interface is a wireless communication interface.

6. The indoor air quality control system according to claim 1, wherein said cloud computing platform provides data browsing to output said information of the indoor air quality and said information of the mobile air quality according to an authorization request, and said cloud computing platform accepts said authorization request issued by a remote device to log in to browse said information of the indoor air quality and said information of the mobile air quality through said remote device.

7. The indoor air quality control system according to claim 6, wherein said remote device is capable of transmitting a current position to said cloud computing platform such that said cloud computing platform acquires information of the outdoor air quality corresponding to said current position from said external data source according to said current position and transmits said information of the outdoor air quality to said remote device.

8. The indoor air quality control system according to claim 7, wherein said cloud computing platform actively transmits an outdoor air pollution warning message to said remote device according to said air pollution warning value when an index corresponding to the outdoor air quality at said current position where said remote device is located reaches said air pollution warning value.

9. The indoor air quality control system according to claim 1, further comprising at least an air conditioning apparatus such that said processing unit is connected to said air conditioning apparatus through said second communication interface to turn on said air conditioning apparatus.

* * * * *